United States Patent [19]

Hubert

[11] Patent Number: 4,513,816
[45] Date of Patent: Apr. 30, 1985

[54] SEALING SYSTEM FOR A WELL BORE IN WHICH A HOT FLUID IS CIRCULATED

[75] Inventor: Miffre Hubert, Elancourt, France

[73] Assignee: Societe Nationale Elf Aquitaine (Production), Courbevoie, France

[21] Appl. No.: 646,036

[22] Filed: Aug. 30, 1984

Related U.S. Application Data

[63] Continuation of Ser. No. 349,314, Feb. 16, 1982, abandoned.

[30] Foreign Application Priority Data

Jan. 8, 1982 [FR] France .............................. 82 00172

[51] Int. Cl.³ .................................................. E21B 33/03
[52] U.S. Cl. .................................. 166/75 R; 166/387; 166/88; 277/27
[58] Field of Search ............... 166/75 R, 75 A, 57, 166/67, 74, 302, 303, 355, 84–88, 367, 387; 277/27, 73, 102, 103, 113, 114; 285/338, 340, 18, 41, 298, 187

[56] References Cited

U.S. PATENT DOCUMENTS

| | | | |
|---|---|---|---|
| 4,258,792 | 3/1981 | Restarick | 166/387 X |
| 4,351,531 | 9/1982 | Maasberg et al. | 277/27 X |
| 4,352,499 | 10/1982 | Foster | 277/102 X |
| 4,381,868 | 5/1983 | Croy et al. | 166/88 X |
| 4,390,063 | 6/1983 | Wells, Jr. | 166/88 X |

FOREIGN PATENT DOCUMENTS 603741 4/1978 U.S.S.R. ................................ 166/84

*Primary Examiner*—James A. Leppink
*Assistant Examiner*—Thuy M. Bui
*Attorney, Agent, or Firm*—Holman & Stern

[57] ABSTRACT

A sealing system for a tubing string in a well bore which is capable of undergoing deformation under the action of a hot fluid and has at least one casing string in which the tubing is housed, a connecting and sealing assembly placed between the casing and the tubing as well as members for supporting and securing the casing and tubing strings comprises in addition, a hollow seal support, the upper end of which is rigidly fixed and the lower end of which is free to permit displacement of the upper portion of the tubing string with respect to the seal support with the lower portion of the tubing string rigidly fixed to the connecting and sealing assembly located near the bottom of the well bore.

32 Claims, 3 Drawing Figures

SEALING SYSTEM FOR A WELL BORE IN WHICH A HOT FLUID IS CIRCULATED

This is a continuation-in-part of application Ser. No. 349,314, filed Feb. 16, 1982 now abandoned.

BACKGROUND OF THE INVENTION

1. Field of the Invention

This invention relates to boreholes and/or producing wells and more particularly to steam-injection wells.

2. Description of the Prior Art

The injection of steam into a well may prove necessary in the working of a mineral deposit or in geothermal power development. In the first case, the injected steam heats the deposit in order to improve the oil/water viscosity ratio. In the second case, the injected steam permits heat storage for subsequent heat recovery.

In both cases, it is essential to ensure that the greater part of the injected steam is employed for the achievement of the desired objective. To this end, devices used for injection of steam must afford the highest possible degree of leak-tightness. However, taking into account the temperature of the injected steam, it often proves difficult to attain such a degree of leak-tightness. The difficulty arises from the fact that devices and materials which are capable of achieving perfect steam-tightness are not currently available. This difficulty is aggravated by the fact that the materials employed in steam-injection wells are subject to processes of expansion and/or conversion which take place in particular at the time of an increase in temperature, for example of the injected steam.

Steam is injected into a string of tubes employed as injection or production tubing placed within a so-called casing string which consists of outer tubes of larger diameter. Injection takes place at considerable depths and more precisely at substantially the same depth as the mineral deposit to be worked or of the reservoir layer of heat to be stored. In consequence it has always been proposed to place the sealing device as close as possible to and above the steam injection level. In the example of a mineral deposit borehole, a connecting and sealing unit designated in current practice by the term "packer" is placed near the bottom of the well bore between the tubing string and the casing string above the orifice or orifices formed in the cylindrical wall of the casing string through which the injected steam passes into the mineral deposit to be worked. Thermal expansion of materials which are liable to undergo deformation such as elongation as a result of a temperature rise is absorbed by a sliding seal placed opposite to the packer and between the packer and the casing string. Since the sliding motion of a seal of this type gives rise to leakages, the injected steam passes during said sliding motion through the small passages formed as a result of wear or aging and then returns upwards to the wellhead. In order to repair a defect of this type, it is necessary to make use of drilling equipment in order to retrieve the packer and tubing string, to change the sliding seal, to return the packer and tubing string assembly downwards into the well and to position said assembly directly within the casing. These different operations make it necessary to cool the well either naturally by allowing it to revert to the adequate temperature for permitting replacement of the sliding seal, which involves an appreciable loss of time, or to produce a thermal shock with all the consequences which this is liable to entail in the case of the other elements and/or devices placed within the well.

BRIEF SUMMARY OF THE INVENTION

The present invention is directed to a sealing system for a steam-injection well in which any sealing defect which may be liable to appear at the time of a thermal expansion can be remedied from the wellhead or in other words at a location which is as close as possible to the surface.

One aim of the present invention is therefore to provide a sealing system of this type in which any steam leakages take place at the wellhead and not at the bottom of the well bore.

To this end, the system is of the type comprising a wellhead unit, at least one tubing string which is capable of undergoing deformation under the action of the hot fluid circulating within said tubing string, at least one casing string which is provided with a perforated zone opposite to a permeable producing formation, and within which said tubing string is housed, a connecting and sealing assembly placed above the perforated zone between the casing string and the tubing string, and members for supporting and securing said casing and tubing strings, said members being mounted at or connected to the wellhead unit. The sealing system essentially comprises in addition a hollow seal support whose upper end is rigidly fixed to a stationary member of the wellhead unit whilst the lower end of said support opens into the upper portion of the tubing string. Said upper portion of the tubing string is free and capable of moving with respect to the seal support whilst the lower portion of said tubing string is rigidly fixed to the connecting and sealing assembly placed near the bottom of the well bore.

By reason of the fact that the tubing string has a free upper end, the movements resulting from a temperature variation within the well bore will consequently take place in the vicinity of said free end which will slide along the sliding seal support.

A further advantage lies in the fact that, when leakage takes place after a certain period of service, the operations to be performed in order to suppress such leakage are limited and do not call for heavy equipment such as drilling equipment.

Furthermore, it should be noted that such operations do not entail the need to withdraw the supporting and sealing assembly from the bottom of the well bore to the wellhead.

Other features of the invention will be more apparent to those skilled in the art upon consideration of the following description with reference to the accompanying drawings, wherein.

DETAILED DESCRIPTION

Figure 1:
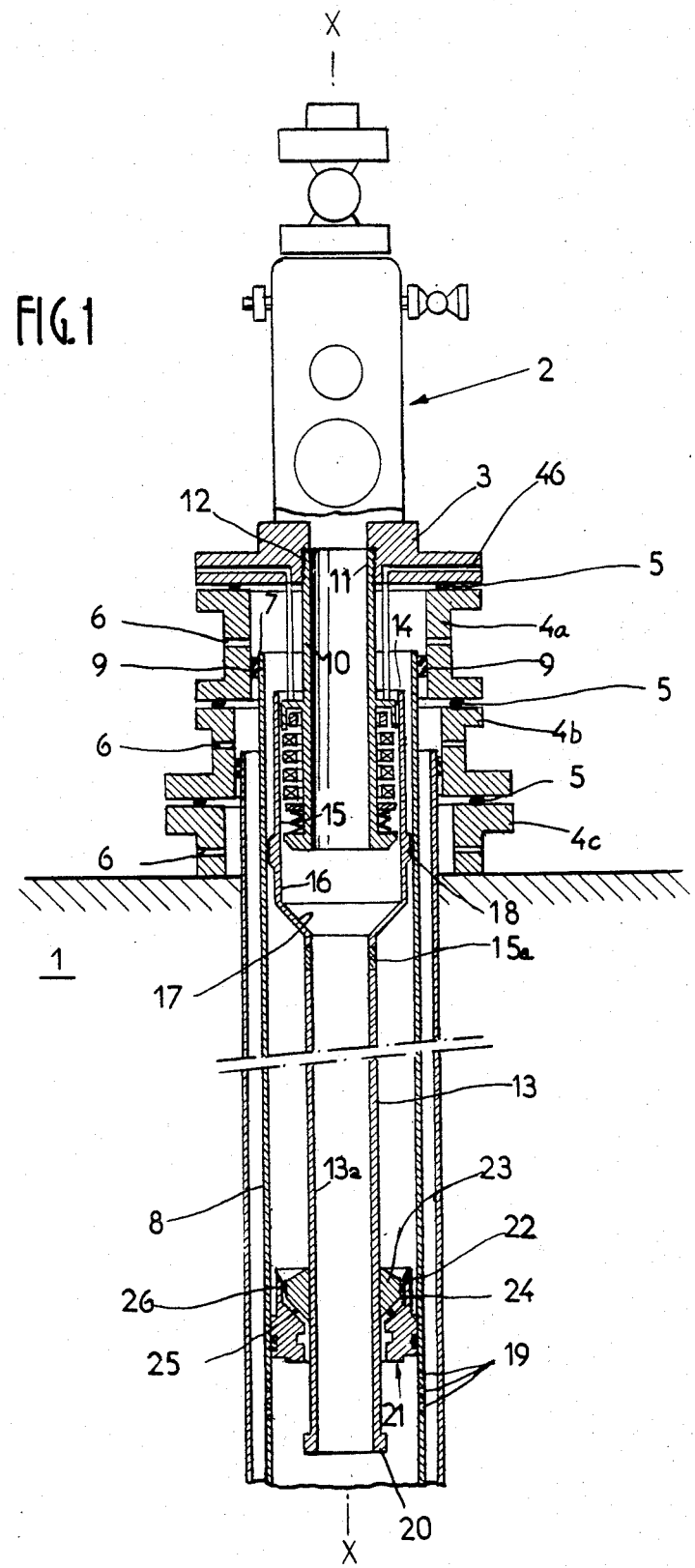
FIG. 1 is a fragmentary cross-sectional view of a well bore with a sealing system according to the invention.

A steam-injection well 1 having a vertical axis of symmetry X—X comprises a wellhead unit 2 on which are mounted all the elements required for working a mineral deposit and especially elements for supporting and displacing production tools. A wellhead unit of this type or so-called Christmas tree is well-known to specialists and will therefore not be described in detail.

Wellhead units or manifolds of the Christmas-tree type are commercialized in particular by the MacEvoy Company. Similarly, the fitting of different tubing strings within the well bore are well-known to those skilled in the art and will not be described hereinafter in detail. On the wellhead unit 2 are mounted in particular an internally-threaded adapter 3 and connecting spools $4_a$ to $4_c$ which are joined together in a suitable manner with interposition of a seal 5. The connecting spools $4_a$, $4_b$, $4_c$ are intended to support the different tubing strings which are inserted in the well bore and each has an annular outlet portion 6.

On the internal face of the connecting spool $4_a$ is fixed the upper end 7 of an outer string of tubing or so-called casing string 8 (as shown in FIG. 1), the lower end of which is not shown since it extends downwards to the bottom of the well bore. The upper end 7 of the casing string 8 is attached to the connecting spool $4_a$ by means of a fitting and sealing member 9 consisting of a sliding seal, for example. Preferably, the upper end 7 of the casing is placed slightly below the annular outlet 6. The end 11 of a hollow seal support 10 is screwed into an internally-threaded bore 12 of the adapter 3. The seal support 10 comprises a number of different elements which will hereinafter be described with reference to FIGS. 2 and 3.

Between the seal support 10 and the casing string 8 is interposed at least one inner tube or production tubing string 13, the top edge 14 of which is free and located below the top edge 7 of the casing string 8 at a distance from the internally-threaded adapter 3 such that any subsequent process of thermal expansion may take place normally. The upper portion 15 of the production tubing string 13 comprises a flared-out portion constituted by a cylindrical portion 16 having a larger diameter than the main body of the production string 13. The cylindrical portion 16 is connected to a frusto-conical portion 17 which can be connected directly to the body of the production string proper. Preferably, the frusto-conical portion 17 is constituted by an element which provides a housing for an operating tool (not shown in the drawings). Similarly, it is preferable to make provision below the frusto-conical portion 17 of the production tubing string 13 for a smaller-diameter cylindrical portion 15a constituting a connector which comprises a seating for subsequent positioning of a sealing-off tool (not shown in the drawings). Guiding members 18 are provided on the external wall of the cylindrical portion 16, thus permitting centering and guiding of the production tubing string 13 along the internal wall of the casing 8.

Holes 19 are formed in situ in the lower portion of the casing string 8 by means of hollow charges, for example. The steam injected through the wellhead into the production tubing string 13 passes through said holes 19 and is discharged through the lower end 20 of the production string 13. Said holes 19, only a small number of which are shown in the drawings, are usually formed in the casing in such a manner as to be located approximately at the center of the producing formation.

A supporting and sealing assembly 21 known as a production packer is fixed within the casing string 8 above the holes 19. The upper portion 22 of the production packer assembly 21 is so shaped as to accommodate and serve as a seating for an annular bearing member 23 which is mounted on the production tubing string 13. The annular bearing member 23 has the shape of a trapezium in vertical cross-section and is placed within a hollowed-out portion or housing 24 formed for this purpose in the packer 21. The production string 13 is supported on the assembly 21 under its own weight by means of the annular member 23 which is applied against the bottom of the housing 24 with interposition of a compression seal 25 mounted within a groove formed in the bottom of said housing 24. Furthermore, a locking lug 26 is also provided on the annular bearing member 23. Said locking lug is capable of moving to a position of insertion within a recess of the packer 21 in order to lock the lower portion of the production tubing string 13 in position.

Figure 2:
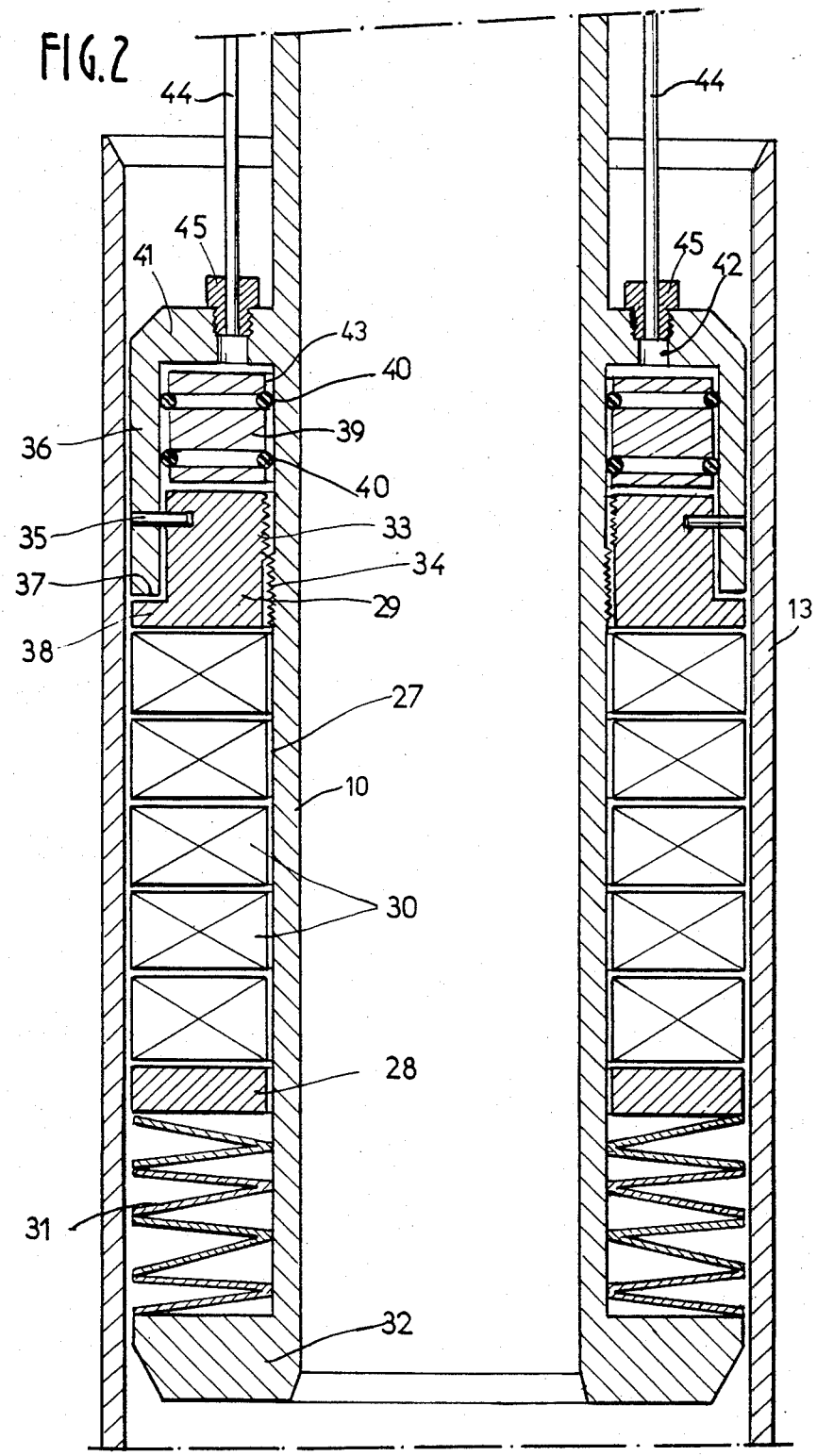
FIG. 2 is an enlarged cross-sectional view of the seal support according to the embodiment shown in FIG. 1.
Figure 3:
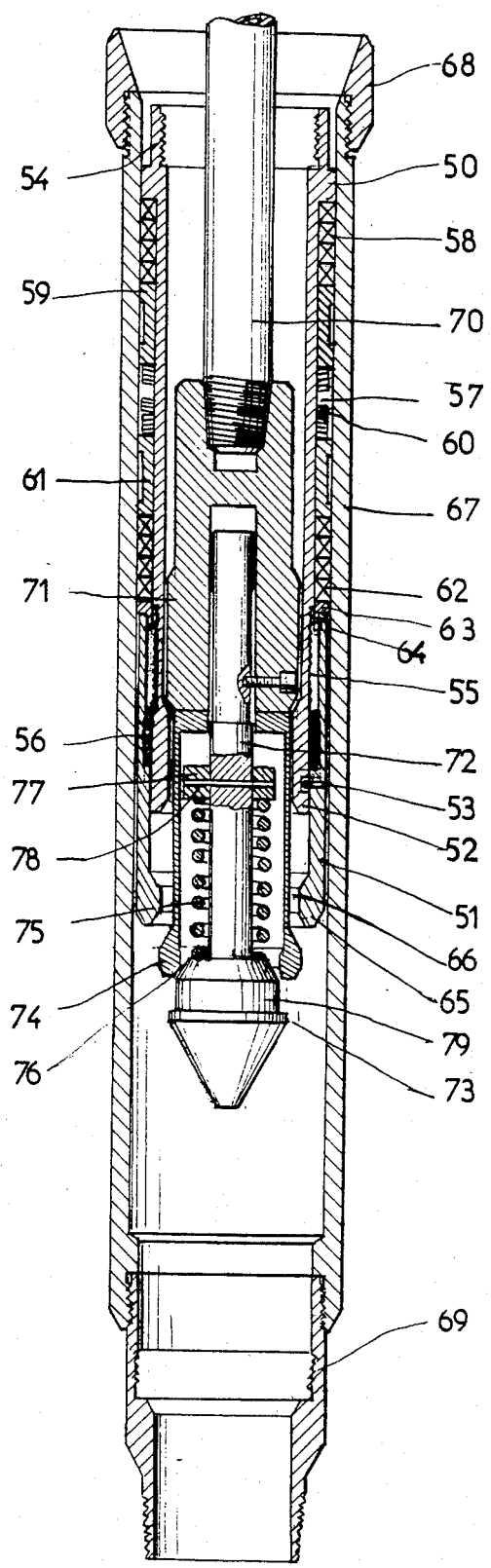
FIG. 3 is a fragmentary part-sectional view of the seal support according to another embodiment.

The seal support 10 according to the invention can have a number of structures such as those illustrated in FIGS. 2 and 3.

In FIG. 2, the seal support comprises a compartment 27, said compartment being open over the greater part of the face which is located opposite to the production tubing 13. Packing seals 30 are housed within the compartment 27 between spacer members 28 and 29. A spring 31 constituted for example by Belleville washers is interposed between the lower end 32 of the seal support 10 and the spacer member 28. The top spacer member 29 is provided with a set of retaining teeth 33 in cooperating relation with a set of retaining teeth 34 formed on the seal support 101, said sets of teeth 33 and 34 being intended to constitute retaining means. A shearing-pin 35 connects the spacer member 29 to a wall element 36 of the compartment 27, the bottom end face 37 of said wall element being capable of bearing on an annular shoulder 38 of the spacer member 29. Pressure means consisting of an annular piston 39 produce action on the packing seals 30 through the intermediary of the spacer member 29. The piston 39 is provided with annular packing rings 40 and is freely mounted within a piston chamber 43 above the spacer member 29 and the top wall 41 of the compartment 27. A passage 42 is formed in the top wall 41 and connects the piston chamber 43 (which is delimited by said top wall 41 and the piston 39) to a pipe 44 fitted with a connector 45 mounted within the passage 42. The pipe 44 is connected to a passage 46 formed within the internally-threaded flange-coupling 3 and connected to a source of fluid under pressure (not shown in the drawings).

The packing seals 30 are arranged freely within the compartment 27 and are put under pressure by admitting the fluid under pressure into the pipe 44. In consequence, the piston 39 undergoes a downward displacement and is applied against the spacer member 29. The force thus exerted on said spacer member 29 is such that the locking-pin 35 is sheared. This in turn permits a downward displacement of said spacer member 29, thus compressing the packing seals 30 in opposition to the spring 31 which stores part of the energy thus transmitted. The downward displacement of the spacer member 29 brings the sets of teeth 33 and 34 into cooperating relation in order to retain and prevent said spacer member 29 from returning to the upward direction when pressure is no longer applied on the piston 39, in spite of the expansion of the spring 31. The packing seals 30 are thus maintained continuously clamped between the spacer members 28 and 29. When slight wear of the packing seals 30 develops and when the energy stored in the spring 31 is not sufficient to ensure good compression of the packing seals but does not indicate the need to replace these latter, fluid under pressure is again admitted into the chamber 43 in order to carry out a further displacement of the piston and the spacer member 29 and to bring this latter into a different position.

When it proves necessary to replace the packing seals 30 as a result of substantial wear arising from successive displacements of the production tubing 13 at the time of thermal expansion, it is apparent that such a replacement does not call either for considerable means or for outage of the steam-injection well for a long period of time. In fact, it is only necessary to separate the seal support from the internally-threaded adapter 3 by unscrewing said seal support and withdrawing it from the well bore. This operation is performed by making use of the light means which are available on production site locations. A further point worthy of note is that it is also unnecessary to allow the well to cool, re-positioning of the seal support 10 together with new packing seals 30 being performed in the manner described in the foregoing. The sealing-off tool is inserted in the production tubing 13 so as to prevent any upward flow of steam when removing the wellhead unit for replacement of the packing seals 30.

The seal support 10 and the constituent elements of the flared-out upper portion of the production tubing 13 are so designed and arranged that the internal diameters of said seal support 10 and of the portion 13a of the production tubing 13 are equal in order to obtain a practically constant cross-sectional area of passage for the injected steam and for any insertion of measuring tools.

In another embodiment which is illustrated in FIG. 3, the seal support 10 is constituted by a hollow tubular body 50 and by a member 51 for putting in compression, said member being designed in the form of a tube which covers the body 50 to a partial extent. The lower end 52 of the hollow body 50 is connected to said member 51 by means of a shearing-pin 53. The upper end 54 of said hollow body 50 is connected to the internally-threaded adapter 3 of the wellhead unit 2 and comprises retaining means constituted by a toothed portion 55 housed within the interior of the member 51 which further comprises a toothed portion 56 in cooperating relation with the toothed portion 55 of the hollow body 50. A recess 57 is formed in the external wall of the body 50. Within the recess 57 are disposed a first set 58 of packing seals, a first spacer member 59, a spring or a stack of Belleville washers 60, a second spacer member 61, another set 62 of packing seals and a third spacer member 63 which is rigidly fixed to the member 51 by means of a locking-pin 64. The lower portion of the member 51 which extends beyond the hollow body 50 has a bearing surface 65 delimited by an internal annular rib 66. The assembly consisting of hollow body 50 and member 51 is housed within a movable containment sleeve 67 constituting a portion of the production tubing string 13. The upper end of said sleeve is screwed into an entrance guide 68 and the lower end of said sleeve is screwed into an adapter 69. The production tubing string 13 of FIG. 1 is also screwed on said adapter but is not illustrated in FIG. 3. The entrance guide 68 is applied against the casing 8 (not shown in FIG. 3) and performs the same function as the guiding member 18 of FIG. 1. The entrance guide 68 is located at a suitable distance from the wellhead unit 2 to permit displacement of the production string 13 at the time of a thermal expansion, for example.

Within the hollow body 50 are housed traction means comprising in particular a traction tube 70 connected to a traction tool 71 in which is fixed a thrust member 72 provided with an annular bearing flange 73 whilst the traction tool terminates in a collar having a shape corresponding to the lower end of the member 51. A spring 75 is mounted between a frusto-conical bearing rim 76 of the thrust member 72 and a bearing ring 77 placed around said thrust member 72 and substantially at the same level as the shearing-pin 53. The ring 77 is fixed on the tool 71 by means of a shearing-pin 78.

In order to carry out compression of the sets of packing seals 58 and 62 as well as compression of the spring 60 when the seal support 10 is placed within the wellhead unit 2, an upward tractive force is applied on the tube 70 which transmits said force to the tool 71 in order to displace this latter in the upward direction until the collar 74 is applied against the bearing surface 65. By continuing to apply traction, the thrust member 72 is displaced upwards so as to bring the vertical portion 79 of the annular flange 73 against the collar 74. At this moment, the collar 74 is wedged between the bearing surface 65 and the vertical portion 79. By maintaining the tractive force, the pin 53 is sheared, thus permitting an upward displacement of the member 51 and a sliding displacement of the toothed portion 56 over the toothed portion 55. Under these conditions, the sets 58 and 62 of packing seals as well as the spring 60 are compressed. By continuing to apply upward traction, the pin 78 is sheared and the collar 74 comes into position against the annular bearing flange 73. When this compression stage is reached, the maximum tractive force of approximately 3 T can then be applied; this is necessary for the achievement of good compression of the packing seals and application of these latter against the burnished wall surface of the containment sleeve 67.

When the tractive force is discontinued, the traction tool 71 moves downwards and the spring 75 then pushes the collar 74 upwards through the intermediary of the ring 77 which is released, thus moving said collar away from the portion 79. Under these conditions, the tool 71 can be released and withdrawn from the well bore so as to provide a free and unobstructed passageway for the injection of steam.

It is apparent that the ranges of travel of the different moving elements are calculated so as to permit the operation described in the foregoing.

As can readily be understood, the present invention is not limited to the embodiments described in the foregoing but extends on the contrary to all alternative forms. Referring again to FIG. 2, it accordingly follows that the hydraulic or pneumatic circuit for exerting thrust on the piston 39 may be replaced by any equivalent device. An equivalent device could consist, for example, of stacks of calibrated balls which are capable of withstanding and transmitting high thrust loads. Stacks of balls of this type could each be housed within a pipe 44 which would accordingly have a suitable shape and suitable dimensions to prevent any relative displacement of the balls which would be liable to have an adverse effect on the transmission of thrust whereas good transmission would be necessary in order to ensure compression of the packing seals 30. Similarly, the unit for transmitting the thrust of the balls to the piston 39 could be constituted by a "carrot" extending by a rod housed within the pipe 44. For reasons of efficiency, the stacks of balls would be uniformly spaced on the piston so as to produce a resultant of forces as close as possible to the axis of displacement of said piston. In consequence, the number of stacks or columns of balls is essentially related to the force to be applied on the pistons.

Another device would simply consist of a suitable link-rod system connected to the piston 39, a link-rod system of this type being clearly capable of transmitting the thrust which is necessary for compression of the packing seals.

What is claimed is:

1. A sealing system for a well bore of the type in which a hot fluid is circulated, comprising a wellhead unit, at least one tubing string which is capable of undergoing deformation under the action of the hot fluid circulating within said tubing string, at least one casing string provided with a perforated zone opposite to a permeable producing formation, said tubing string being housed within said casing string, a connecting and sealing assembly above the perforated zone operatively interposed between the casing string and the tubing string to support said tubing string, casing string support members for supporting and securing said casing string mounted at or connected to the wellhead unit, a hollow seal support having an upper end rigidly fixed to a stationary member of the wellhead unit and a portion telescopingly engaging in and opening into the top portion of the tubing string to form an annulus between said lower portion of said seal support and said top portion of said tubing string, said top portion of the tubing string being free and capable of moving with respect to the seal support with the bottom portion of said tubing string rigidly fixed to said connecting and sealing assembly placed near the bottom of the well bore, seal means operatively interposed between the telescoping portions of said seal support and tubing string in said annulus to seal the annulus formed by and between said telescoping portions upon the application of pressure to at least one end of said seal means, and pressure means to apply pressure to said at least one end of said seal means.

2. A sealing system according to claim 1 wherein said top portion of said tubing string comprises upper and lower cylindrical portions of different diameters connected to each other by means of a frusto-conical portion, the upper cylindrical portion having the larger diameter and comprising the free end of said tubing string and the lower cylindrical portion being connected to the main body of the tubing string and having a diameter equal to that of said main body of the tubing string.

3. A sealing system according to claim 2, wherein the internal diameter of the seal support is equal to the internal diameter of the main body of the tubing string.

4. A sealing system according to claim 1, wherein said connecting and sealing assembly comprises an external annular bearing member on the tubing string and an internal annular bearing member on the casing string in cooperative engagement with said external bearing member so that said tubing string is supported by its own weight.

5. A sealing system according to claim 4, and further comprising a locking lug on said external annular bearing member operatively engageable with said internal bearing member for securing the main body of the tubing string within said connecting and sealing assembly.

6. A sealing system according to claim 1, wherein the distance between the top end of the free top portion of the tubing string and the wellhead is at least equal to the movement of said top end due to thermal expansion produced by the hot fluid which circulates within said tubing string.

7. A sealing system according to claim 1, wherein the top portion of the tubing is provided with means for guiding it along the adjacent casing.

8. A sealing system according to claim 1, wherein the seal support is constituted by a hollow cylinder having an external annular compartment for the packing seals, the upper end of said compartment being rigidly fixed to the wellhead unit and the lower end of said compartment being rigidly fixed to movable means for putting the packing seals in compression, said compression means being so arranged as to surround said hollow cylinder to a partial extent and provided with retaining means in cooperating relation with other retaining means carried by said hollow cylinder.

9. A sealing system according to claim 8, wherein the retaining means consist of sets of teeth.

10. A sealing system according to claim 8, wherein the hollow cylinder and the movable means are placed within a movable container connected to the main body of the tubing.

11. A sealing system according to claim 10, wherein the upper end of the movable container is fixed within guiding means applied against the internal wall of the adjacent casing.

12. A sealing system according to claim 11, wherein the distance between the wellhead and the free edge of the guiding means is such that any movement of the tubing caused by circulation of the hot fluid and transmitted by means of the movable container can take place without difficulty.

13. A sealing system according to claim 8, wherein displacement of the compression means is carried out by traction means housed without said hollow cylinder and controlled from the wellhead, said traction means being subsequently removed when the packing seals are compressed to the desired value so as to permit circulation of the hot fluid within the tubing.

14. A sealing system according to claim 13, wherein the traction means comprise a collar in cooperating relation with the lower end of the movable compression means.

15. A sealing system according to claim 14, wherein the lower end of the movable compression means has a bearing surface and an internal retaining rib for said collar.

16. A sealing system as claimed in claim 1 wherein: said seal support comprises a cylindrical tubular member, an upper flange member and a lower flange member axially spaced on and extending radially outwardly from the outer periphery of said cylindrical tubular member to form said annulus therebetween; said seal means comprises radially expandable packing seals disposed in said annulus; and said pressure means comprises resilient means between one of said flange members and the adjacent end of said packing seals, and a piston-cylinder means including piston means in the other of said flange members operatively arranged to apply said pressure to the other end of said packing seals adjacent thereto, and means to operate said piston-cylinder means.

17. A sealing system according to claim 16, wherein the top portion of the tubing string comprises at least one portion of larger diameter than the main body portion of said tubing and a frusto-conical portion between said larger diameter portion and said main body portion, the packing seals being in contact with the portion of larger diameter.

18. A sealing system according to claim 17 wherein said pressure means further comprises stacks of balls each housed within a duct having dimensions such as to prevent any substantial relative displacement of said balls within said duct, the design function of said balls being to produce action on a thrust member which cooperates with the piston means.

19. A sealing system according to claim 17 wherein said pressure means further comprises a link-rod system connected to the piston means and capable of transmitting a thrust which is necessary to produce compression of the packing seals.

20. A sealing system according to claim 16 wherein said pressure means further comprises stacks of balls each housed within a duct having dimensions such as to prevent any substantial relative displacement of said balls within said duct, the design function of said balls being to produce action on a thrust member which cooperates with the piston means.

21. A sealing system according to claim 16 wherein said pressure means further comprises a link-rod system connected to the piston means and capable of transmitting a thrust which is necessary to produce compression of the packing seals.

22. A sealing system as claimed in claim 16 wherein said piston-cylinder means comprises: an axially extending cylindrical sleeve portion on the respective flange member radially spaced from the outer periphery of said seal support to form an annular cylinder therebetween; an annular piston in said cylinder; and a source of pressure fluid to operate said piston toward said packing seals.

23. A sealing system as claimed in claim 22 and further comprising: a spacer interposed between said piston and said packing seals and at least partly within said cylinder in axially slidable relationship therewith; first retaining teeth on said spacer; and second retaining teeth on said seal support adapted to engage with said first teeth when said spacer is displaced axially by said piston a predetermined amount to retain said spacer in the displaced position.

24. Tubing for a well bore extending from a wellhead to a producing formation through subsurface formations and having means for cooperating with a packer disposed between said tubing and a casing which surrounds said tubing, fluid-tight seals being provided by said packer between said casing and the lower portion of said tubing, wherein said tubing comprising:
a hollow body extending approximately from said wellhead to said producing formation;
a hollow seal support member disposed within said hollow body, the upper end of said hollow seal support member being adapted to extend outwards from said hollow body and being attached to said wellhead;
sealing means disposed between said hollow body and hollow seal support member for providing a fluid-tight seal therebetween, the upper part of said hollow body being free to move towards said wellhead when said tubing is in operation.

25. Tubing according to claim 24, wherein said hollow seal support member comprises an outer peripheral recess for receiving said sealing means, said sealing means comprising at least one seal member and resilient means between said seal member and said seal support member to form a movable fluid-tight barrier between said hollow seal support member and said hollow body.

26. Tubing according to claim 25, wherein said hollow seal support member and sealing means further comprise seal retaining means in said recess adjacent the ends of said seal member cooperating with said seal support member to retain said seal member in said recess.

27. Tubing according to claim 24, wherein said hollow body comprises a top portion which receives said hollow seal support member and has a diameter larger than the rest of said body.

28. Tubing according to claim 27, wherein said top portion of said tubing comprises two cylindrical upper and lower portions of different diameters connected to each other by means of a frusto-conical portion, the upper cylindrical portion having said larger diameter and comprising the free end of said tubing with the lower cylindrical portion connected to the main body of the tubing and having a diameter equal to that of said main body of said tubing.

29. Tubing according to claim 28, wherein the hollow seal support member has a bore therethrough having an internal diameter equal to the internal diameter of the main body of said tubing.

30. Tubing according to claim 29, wherein said tubing is supported on the connecting and sealing assembly under its own weight by means of an external annular bearing member provided on the tubing main body.

31. Tubing according to claim 30, and further comprising a locking lug on said external annular bearing member for securing the main body of the tubing within said connecting and sealing assembly.

32. Tubing according to claim 27, wherein the distance between the free top edge of the tubing and the wellhead is at least equal to the axial movement of the tubing produced by the hot fluid which circulates within said tubing.

* * * * *